United States Patent Office 3,206,426
Patented Sept. 14, 1965

3,206,426
HYDROXY ARYL ESTERS OF ORGANIC CHLOROFORMATES
Henno Keskkula and John A. Schmitt, Midland, Mich., assignors to The Dow Chemical Company, Midland, Mich., a corporation of Delaware
No Drawing. Filed May 12, 1961, Ser. No. 109,509
6 Claims. (Cl. 260—31.2)

The present invention relates to a new class of organic compounds and compositions of matter containing the same and more particularly concerns a novel class of compounds having the general formula:

$$HO-Ar-O-\overset{O}{\underset{\|}{C}}-O-R \qquad I$$

wherein —Ar— represents the residue remaining after removal of two hydroxyls of a diphenol and R represents the residue remaining after removal of the —CO$_2$Cl of an organic chloroformate. The new compounds have been found to be useful as lubricants for polymeric materials and in certain instances as antioxidants for polymeric materials containing aromatic nuclei in the polymer.

The novel class of compounds can conveniently be prepared by reacting by contacting a diphenolic compound having the formula:

$$HO-Ar-OH \qquad II$$

with an organic chloroformate having the formula $$Cl-\overset{O}{\underset{\|}{C}}-O-R \qquad III$$

wherein in each of the Formulas II and III the symbols —Ar— and —R have the same significance as set forth in Formula I. The reaction is carried out in the presence of a hydrogen chloride acceptor which is soluble in the reaction mixture. The reaction being somewhat exothermic, good results can be obtained by carrying out the reaction at from about 0° C. to about 100° C. The temperature can conveniently be controlled by external cooling and/or stirring, employment of a large excess of solvent having a boiling point near the reaction temperature desired and/or portionwise addition of the reactants one to the other. The reaction can be carried out in a batch, semi-continuous or continuous manner and under sub-atmospheric, atmospheric or super-atmospheric pressures.

The diphenolic compounds which can be employed as starting materials in accordance with the present invention include the diphenols such as diphenol, dimethyldiphenol, diethyldiphenol, dipropyldiphenol, diisopropyldiphenol, dibutyldiphenol, diisobutyldiphenol, di t.-butyldiphenol as well as the nuclear halogenated derivatives such as dichlorodiphenol and the like; the bisphenols such as the methylenebisphenols,
methylenebis(methylphenols),
methylenebis(ethylphenols),
methylenebis(propylphenols),
methylenebis(isopropylphenols),
methylenebis(butylphenols),
methylenebis(t.-butylphenols),
ethylidenebisphenol, the
ethylidenebis(methylphenols),
ethylidenebis(ethylphenols),
ethylidenebis(propylphenols),
ethylidenebis(isopropylphenols),
ethylidenebis(butylphenols),
ethylidenebis(isobutylphenols),
ethylidenebis(t.-butylphenols),
isopropylidenebisphenol, the
isopropylidenebis(methylphenols),
isopropylidenebis(ethylphenols),
isopropylidenebis(propylphenols),
isopropylidenebis(isopropylphenols),
isopropylidenebis(butylphenols),
isopropylidenebis(isobutylphenols),
cyclohexylidenebisphenol,
cyclopentylidenebisphenol and their nuclear-substituted derivatives, as well as the nuclear-halogenated derivatives. Thus, it is to be understood that substantially any polyhydroxy aromatic compound can be employed so long as it falls within the generic formula $$HO-Ar-OH \qquad II$$

and does not have substituent groups reactive with a chloroformate under the conditions of reaction other than the aromatic hydroxyl groups.

The organic choloroformates which can be employed in accordance with the present invention include the aliphatic, aryl and substituted aryl chloroformates having no substituents reactive with aromatic hydroxyl other than chlorine of the chloroformate moiety. Thus one can employ the alkyl chloroformates, such as, methyl, ethyl, propyl, isopropyl, butyl, isobutyl, t.-butyl, pentyl and its isomers, hexyl and its isomers, heptyl and its isomers as well as the cycloalkyl chloroformates such as cyclopentyl and cyclohexyl chloroformate. A further class of organic chloroformates useful in preparing compounds in accordance with the present invention are the chloroformate esters of alkyl ethers of glycols and polyoxyalkylene glycols such as 1-methoxy-2-propane, dipropylene glycol methyl ether, tripropylene glycol methyl ether, and the like. Further one can also employ the aryl and substituted aryl chloroformates, such as, phenyl, methylphenyl, ethylphenyl, benzyl, naphthyl chloroformates and the like to name only a few. It is thus to be understood that any organic chloroformate having the following formula:

$$Cl-\overset{O}{\underset{\|}{C}}-O-R \qquad III$$

having no groups in the organic R radical reactive with chlorine of the chloroformate moiety or aromatic hydroxyl can be employed.

It is to be understood that the proportions of reactants while preferably employed in substantially equimolar quantities can be employed in other proportions so long as there is present during the reaction no more than a 10 percent excess of chloroformate over that theoretically necessary to form the monoester of the polyhydroxy compound. Thus, any proportion of chloroformate from about 0.1 to 1.1 moles per mole of aromatic hydroxy compound can be employed and some of the desired product will be produced.

Inert organic solvents which can conveniently be employed are the halogenated hydrocarbon solvents such as methylene chloride, ethylene chloride (1,2-dichloroethane), 1,1,1-trichloroethane (methylchloroform), 1,1,2-trichloroethane, trichloroethylene, perchloroethylene, and the like.

The preferred hydrogen chloride acceptors are those soluble in the organic reactants or solvent. Suitable compounds include pyridine, the tertiary amines, such as dimethylaniline, isoquinoline, triethylamine and the like. Other well known hydrogen chloride acceptors which meet the solubility requirement are known to those skilled in the art and need no further illustration here.

The following examples illustrate the present invention but are not to be construed as limiting:

EXAMPLE 1

4,4'-isopropylidenebisphenol (Bisphenol A), 57 grams (0.25 mole) was dissolved in 400 ml. of methylene chloride and 25 ml. of pyridine then added. Ethyl chloroformate, 25 ml. (0.26 mole) was added dropwise at about room temperature with stirring over a two hour period. The resulting solution was washed with dilute HCl then with water to remove the pyridine and its salt. The methylene chloride was evaporated from the organic phase to recover a viscous, oily liquid with an ester odor. Distillation of the organic phase produced 60 grams of clear viscous liquid at room temperature having a boiling point of 200–205° C. at 0.5–0.7 mm. Hg. The product was identified as the monoethyl carbonate of Bisphenol A.

EXAMPLE 2

To 78 g. (0.25 mole) of 4,4'-isopropylidenebis(2-isopropylphenyl) (Bisphenol G) in 400 ml. methylene chloride and 25 ml. pyridine there was added 25 ml. (0.26 mole) of ethyl chloroformate dropwise over a 2-hour period at room temperature with stirring. The resulting solution was washed with dilute HCl and then with water to remove pyridine and its salt. The methylene chloride was evaporated from the organic phase to recover a viscous, oily liquid with an ester odor. Distillation of the organic phase produced 80.1 g. of clear, viscous liquid at room temperature having a boiling point of 201–203.5° C./0.7–0.9 mm. The product was identified as the monoethyl carbonate of 4,4'-isopropylidenebis(2-isopropylphenol).

The following examples illustrate the utility of the new compounds as lubricants and antioxidants for organic aromatic polymers such as vinyl and polyvinyl benzene polymers and polycarbonates. The amount of the lubricant or antioxidant of the present invention can vary considerably with the polymer employed. However, it has been found advantageous to employ from 0.1 to about 5 percent by weight of one of the novel compounds here described and preferably from about 1.5 to 2.5 percent by weight.

EXAMPLE 3

Two percent of the liquid product of Example 2 was blended on 3″ x 8″ compounding rolls into unlubricated polystyrene. Butyl stearate (the common lubricant for plastics) and unlubricated blank polymers were used as controls. Mechanical properties were determined and fabricating efficiency was reported as a ratio of the difference in molding temperature (control minus lubricated sample) to the difference in heat distortion temperature. The higher the value of this ratio the more efficient the lubricant. The compositions were also submitted to 48 hours of Fade-O-Meter exposure.

Properties of blends with polystyrene are indicated in Table I.

*Table I*

| Polymer | Additive (2%) | Molding Temp., °F. | Tensile, p.s.i. | Elong., percent | Elong. after 48 Hours Fade-O-Meter | Impact, ft./lbs./in. | Heat Distortion | | Lubricating Efficiency | |
|---|---|---|---|---|---|---|---|---|---|---|
| | | | | | | | ASTM D648-56, °C. | Vicat,[3] °C. | ([5]) | ([6]) |
| Polystyrene [1] | None | 425 | 7,900 | 2.5 | | .52 | 83.5 | 98.5 | | |
| | Butyl stearate [1] | 395 | 6,500 | 1.6 | | .71 | 76 | 89.5 | 4 | 3.3 |
| | E G [4] | 405 | 7,970 | 2.6 | | .61 | 79 | 94 | 4.5 | 4.5 |
| Polystyrene [2] | None | 400 | 5,010 | 19.2 | 2.5 | 1.62 | 77 | 85 | | |
| | Butyl stearate | 375 | 4,450 | 26.6 | 2.6 | 2.00 | 66.5 | 80 | 2.4 | 5 |
| | E G [4] | 385 | 5,010 | 21.5 | 3.4 | 1.80 | 70 | 83.5 | 2.2 | 10 |

[1] Polystyrene manufactured and sold under the tradename of Styron 666.
[2] Rubber-modified polystyrene manufactured and sold under the tradename of Styron 475.
[3] Vicat is an ASTM D1525-58T heat distortion test.
[4] E G—monoethyl carbonate of Bisphenol G.
[5] ASTM D648-56 heat distortion temperature used in calculation.
[6] Vicat ASTM D1525-58T heat distortion temperature used in calculation.

EXAMPLE 4

Polymer compositions containing various lubricants were prepared in capillary melt viscometers in the manner described by H. J. Karam et al. in Modern Plastics, March 1955. Two percent by weight of lubricant was added with well dried polycarbonate ester resin (Lexan 150) and the capillary melt viscometer used as a mixing extruder. After the lubricant had been well mixed with the polymer, melt viscosity was determined at several different temperatures. At 310° C. melt viscosity was determined as a function of time. Thermally stable compositions showed little or no reduction in melt viscosity over a period of 75 minutes, while the compositions undergoing degradation showed reduction of melt viscosity very quickly.

The following table shows some of the data to illustrate this invention.

*Table II*

| Additive (2% by Weight) | Apparent Melt Viscosity poises at 700,000 dynes/cm.² | | |
|---|---|---|---|
| | 270° C. | 290° C. | 310° C. |
| None | 17,900 | 10,040 | 5,450 |
| 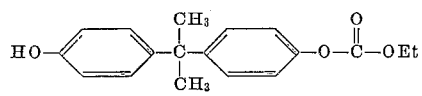 | 942 | 390 | 123 |
| 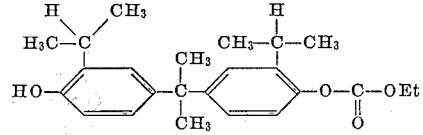 | 9,140 | 2,610 | 1,130 |

The lubricated composition containing the 4,4'-isopropylidenebis(2-isopropylphenol) ester was kept in the capillary melt viscometer for an additional 75 minutes and reduction of melt viscosity determined (1130 poises to 728 poises). Even after such a heat treatment the exudate remained tough and flexible.

We claim:

1. A compound having the formula

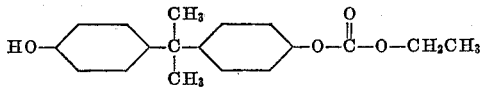

2. A compound having the formula

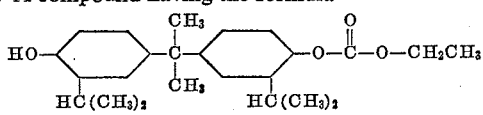

3. A compound having the formula

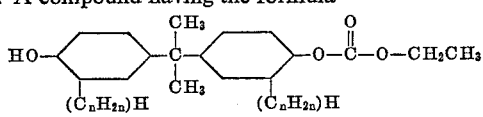

wherein $n$ represents an integer from 0 to 4.

4. A lubricated polymer comprising a material selected from the group consisting of vinyl benzene polymers and polycarbonate ester resin containing from 1.5 to 2.5 percent by weight of a compound of claim 3.

5. The lubricated polymer of claim 4 wherein said polymer is a polymerized styrene and the lubricant is the monoethyl carbonate of 4,4'-isopropylidene bis(2-isopropylphenol).

6. The lubricated polymer of claim 4 wherein said polymer is a polycarbonate.

References Cited by the Examiner

UNITED STATES PATENTS 2,379,250  6/45  Muskat et al. _____ 260—463
2,381,511  8/45  Muskat et al. _____ 260—463

MORRIS LIEBMAN, *Primary Examiner.*

LEON J. BERCOVITZ, ALEXANDER H. BRODMERKEL, *Examiners.*